Aug. 18, 1953     L. GOLDHAMER     2,649,024
LENS AND SHUTTER COMBINATION MOUNTING
Filed Feb. 10, 1951     2 Sheets-Sheet 1
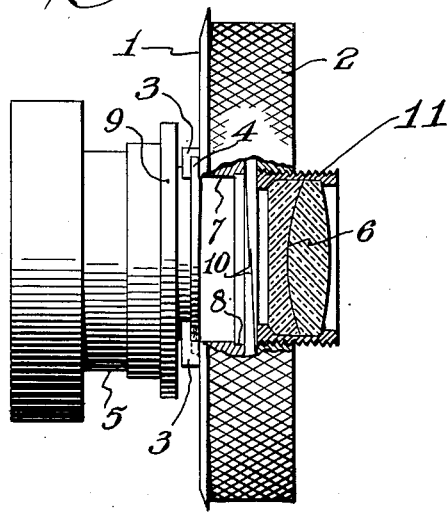
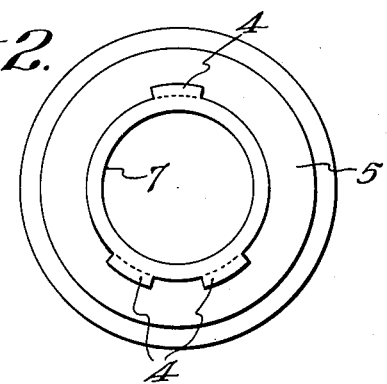
INVENTOR
Leo Goldhammer
BY
HIS ATTORNEYS Aug. 18, 1953     L. GOLDHAMER     2,649,024
LENS AND SHUTTER COMBINATION MOUNTING
Filed Feb. 10, 1951     2 Sheets-Sheet 2
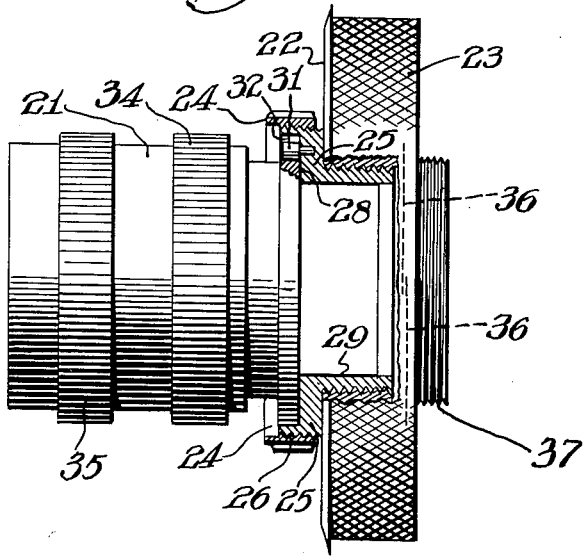
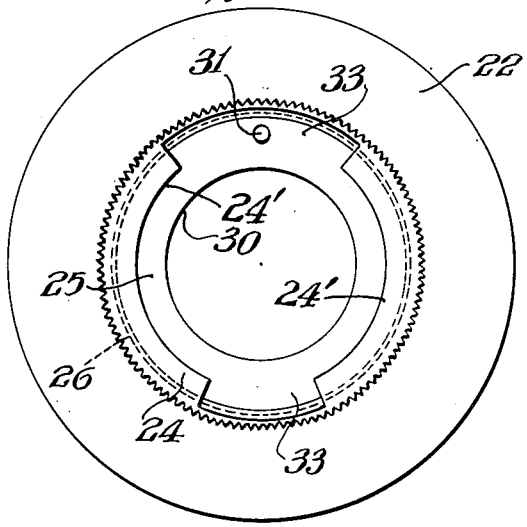
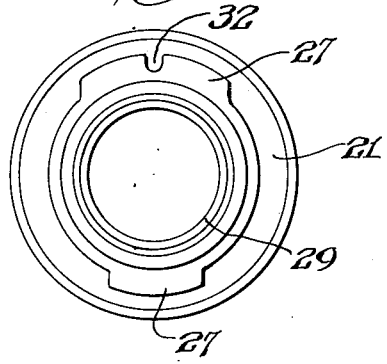
INVENTOR
Leo Goldhammer
BY
HIS ATTORNEYS / Patented Aug. 18, 1953

2,649,024

UNITED STATES PATENT OFFICE 2,649,024

LENS AND SHUTTER COMBINATION MOUNTING

Leo Goldhamer, Munich, Germany

Application February 10, 1951, Serial No. 210,365
In Germany February 16, 1950

2 Claims. (Cl. 88—57)

The present invention relates to a lens and shutter combination for photographic cameras, especially miniature picture cameras. More particularly, it concerns such a combination that permits exchanging of the whole or part of the lens system without removal or exposure of the light-sensitive film in the camera.

Almost all of the modern miniature picture cameras are provided with focal plane or slit shutters and offer the possibility of exchanging one lens for another having a different focal length. There are also available some miniature picture cameras having shutters located adjacent to the lens system or between its components. Such central shutters, in contrast to the slit shutters, permit one to make shorter exposures employing flash light apparatus having the briefest period of illumination, for example one five thousandths of a second. Unfortunately, most of the miniature picture cameras having central shutters that are available on the market have the disadvantage that the lens cannot be exchanged for another. One has already proposed in the case of roll film cameras of larger size to exchange the lens together with the central shutter. This was possible, however, when the camera was loaded with film, only by using an additional shutter, since the exposed film within the camera does not permit the removal of a lens that is built into the shutter casing.

It has also been proposed to unscrew the front member of a lens and to exchange it against one having a longer focal length. Such a screw mounting has not been successful, because this kind of an exchange device is readily soiled or damaged and the front member of the lens after the exchange assumes a different position from that of its predecessor before the exchange.

The object of this invention is to provide means whereby the entire lens or its front member can be exchanged, when using a central shutter, without introducing an auxiliary shutter between the lens and the light-sensitive layer. Thus, the focal length of the lens can be varied without varying its focal width, and pictures of varying proportions can be made with a loaded miniature picture camera. This object is achieved by means of a special construction of the central shutter casing and lens mounting.

According to the invention the shutter casing is provided with a fitting surface for the lens mounting that is to be exchanged, and with a bayonet fastener for rigidly holding the lens mounting or that of its front member to the shutter casing and yet readily permitting removal thereof. The fitting surface at the shutter casing cooperates with a correspondingly formed fitting surface at the lens mounting, preferably two cylindrical surfaces, in such a manner as to make possible a rapid and precise centering of the lens. A bearing surface at the shutter casing makes it possible precisely to maintain the required distance between the lens and the focal plane, so that very sharp exposures can be made with any desired lens combination. The bayonet fastener at the shutter casing also assures that every substitute lens mounting can easily and quickly be wedged tightly against this bearing surface and held there securely.

A particularly desirable embodiment of the invention results, when exchanging only the front member of the lens, if the blades of the central shutter swing in a plane that lies between the exchangeable portion of the lens and the light-sensitive layer. In case the entire lens is to be exchanged, then the shutter blades are arranged behind the rear member of the lens, i. e. between the entire lens and the light-sensitive layer.

The particular form of the bayonet fastener can be chosen as desired. Either one holding member is provided at the exchangeable lens mounting and the other at the shutter casing, or a locking ring is provided at the shutter casing into which tabs provided at the lens mounting are inserted and by turning the locking ring are firmly pressed against the bearing surface at the shutter casing. The bearing surface and the cylindrical fitting surface may either be provided directly on the shutter casing or both of these parts may be provided on an insert body which is screwed into the shutter casing or secured thereto in some other way.

A fitting peg may be provided on the shutter casing or on the insert body, which assures that the exchangeable lens mounting will always be attached to the shutter casing in the same relative position of rotation, i. e. with the distance and diaphragm scales upwards.

It is, of course, possible to make many modifications in the construction of the exchangeable lens mounting, the shutter casing and the holding means without departing from the scope and spirit of the invention. The important thing is that in all such embodiments of the invention there is provided a secure fitting surface or seat and a secure bearing surface at the shutter casing against which the exchangeable lens mounting is firmly held by means of a bayonet fastener.

In the accompanying drawings two embodiments of the invention are illustrated by way of example. In these drawings Fig. 1 shows a shutter casing, partly in section, including the permanent rear member of the lens, said shutter casing being combined with an exchangeable lens mounting including a front member of the lens.

Fig. 2 is a rear view of the exchangeable lens mounting shown in Fig. 1.

Fig. 3 shows a central shutter casing combined by means of a locking ring with an exchangeable lens mounting that includes the entire lens.

Fig. 4 is a rear view of the exchangeable lens mounting shown in Fig. 3.

Fig. 5 is a front view of the shutter casing and locking ring shown in Fig. 3.

Referring first to the embodiment shown in Figs. 1 and 2 there are arranged on the front wall 1 of the shutter casing 2, three hooks 3 to serve as the holding members of a bayonet fastener. These hooks 3 grasp correspondingly arranged tabs 4 at the back of the exchangeable lens mounting 5 for the front member of the camera lens. The rear member 6 of the lens is firmly screwed into the shutter casing 2 and is not exchanged in this embodiment of the invention. The rear lens member 6 is mounted in a threaded sleeve supporting member 11 which in turn is threaded into the shutter casing 2, the projecting portion of the threaded sleeve 11 serving as a convenient means for interchangeably connecting the shutter casing 2 to the camera body (not illustrated). The hooks 3 or the tabs 4 have a wedge-shaped form, so that after inserting the tabs 4 behind the hooks 3 as shown, both of these holding members can be firmly wedged together by a turning movement of the lens mounting 5, thus affixing the lens mounting 5 to the shutter casing 2. In this manner of joining the two parts the back surfaces of the tabs 4 are brought firmly against the bearing surface of the front wall 1 of the shutter casing 2, thus insuring proper spacing between the lens members.

The exact centering of the exchangeable lens member in the shutter casing is very important. This centering is attained by introducing the fitting cylinder 7 that projects from the back of the lens mounting 5 into the fitting tube 8 in the shutter casing 2. The exchangeable lens mounting 5 may include a lens combination, which together with the rear member 6, furnishes a normal focal length for the picture size to be exposed. Or it may include lens members, which together with the rear member 6, result in a total focal length that is substantially greater than normal. It is also possible thus to form a compound lens having a lesser focal length than normal. It should also be mentioned that the diaphragm is preferably arranged in the exchangeable lens mounting 5 at the location indicated by 9, whereas the shutter blades 10 are preferably located in front of the rear member 6 of the lens, i. e. between the front and back members of the combined lens.

In the embodiment shown in Figs. 3 to 5 a bayonet fastener is also employed. In this embodiment the entire lens is included in the lens mounting 21 which can be exchanged with the aid of the bayonet fastener that is provided on the front wall 22 of the shutter casing 23. A locking ring 24 forms part of the bayonet fastener and may be attached directly to the shutter casing 23 or rotatably connected thereto, as shown, by means of an insert body 25 and screw thread 26.

The locking ring 24 with locking flanges 24' grasps the tabs 27 at the back of the lens mounting 21 and wedges them against the bearing surface 28 at the front of the insert body 25. Also in this case the exchangeable lens mounting 21 is provided with a fitting cylinder 29 for the purpose of centering the lens in the shutter casing 23. This fitting cylinder 29 fits within a fitting tube 30 in the insert body 25.

A fitting peg 31 in the insert body 25 reaches into a cut-out portion 32 of the upper tab 27 of the lens mounting 21 and thus assures the proper relative position of rotation of the two parts 21 and 23 that are to be combined. The cut-out portions in the locking ring 24 through which the tabs 27 are inserted carry the reference numeral 33. An adjusting ring for the diaphragm included in the lens mounting 21 bears the reference numeral 34, while a distance-adjusting ring on said lens mounting is identified by the reference numeral 35. The shutter blades are included in the shutter casing 23 and are indicated in Fig. 3 by the broken lines 36.

The shutter casing 23 also includes an integral threaded extension 37 which serves as a convenient means for connecting the shutter casing interchangeably to the camera body (not illustrated). It will be readily understood that any suitable connecting structure may be used for firmly supporting the shutter casing within the camera body.

What is claimed is:

1. A lens and shutter combination for use in a miniature camera which comprises a central shutter casing bearing an insert body at the front and means for securing the shutter casing to the camera, an exchangeable lens mounting attached to said insert body by means of a bayonet fastener, said lens mounting having a cylindrical projection at the back adapted to fit into a corresponding recess at the front of said insert body, to thereby precisely center the lens mounting with respect to the shutter casing, and tabs carried by the back of said lens mounting and pressing against a bearing surface at the front of the insert body by means of a locking ring having locking flanges in cooperative relation with said tabs, whereby the required distance between the lens and the focal plane is precisely maintained.

2. A combination as claimed in claim 1, wherein the insert body is provided with a locking peg that fits into a recess at the back of the lens mounting to insure proper relative position of rotation of the shutter casing and the lens mounting.

LEO GOLDHAMER.

References Cited in the file of this patent

UNITED STATES PATENTS

| Number | Name | Date |
| --- | --- | --- |
| 1,984,544 | Pearlman | Dec. 18, 1934 |
| 2,052,261 | Verschoor | Aug. 25, 1936 |
| 2,083,637 | Colaiace | June 15, 1937 |
| 2,110,477 | Wittel | Mar. 8, 1938 |
| 2,136,149 | Nuchterlein | Nov. 8, 1938 |
| 2,260,991 | Gorey | Oct. 28, 1941 |